United States Patent [19]

Huttenlocher et al.

[11] Patent Number: 5,410,611
[45] Date of Patent: Apr. 25, 1995

[54] METHOD FOR IDENTIFYING WORD BOUNDING BOXES IN TEXT

[75] Inventors: Daniel P. Huttenlocher, Ithaca, N.Y.; Eric W. Jaquith, Amherst, N.H.

[73] Assignee: Xerox Corporation, Stamford, Conn.

[21] Appl. No.: 169,949

[22] Filed: Dec. 17, 1993

[51] Int. Cl.6 .............................................. G06K 9/34
[52] U.S. Cl. .................................... 382/9; 382/18
[58] Field of Search ...................... 382/9, 16, 18, 51

[56] References Cited

U.S. PATENT DOCUMENTS

| | | | |
|---|---|---|---|
| 2,905,927 | 9/1959 | Reed | 340/149 |
| 3,133,266 | 5/1964 | Frishkopf | 340/146.3 |
| 3,295,105 | 12/1966 | Gray et al. | 340/146.3 |
| 4,010,445 | 3/1977 | Hoshino | 340/146.3 |
| 4,155,072 | 5/1979 | Kawa | 340/146.3 |
| 4,326,190 | 4/1982 | Borland et al. | 340/146.3 |
| 4,400,828 | 8/1983 | Pirz et al. | 382/30 |
| 4,495,644 | 1/1985 | Parks et al. | 382/3 |
| 4,513,442 | 4/1985 | Scherl | 382/9 |
| 4,558,461 | 12/1985 | Schlang | 382/9 |
| 4,701,960 | 10/1987 | Scott | 382/3 |
| 4,731,857 | 3/1988 | Tappert | 382/9 |
| 4,764,972 | 8/1988 | Yoshida et al. | 382/13 |
| 4,809,344 | 2/1989 | Peppers et al. | 382/32 |
| 4,827,529 | 5/1989 | Peppers et al. | 382/9 |
| 4,847,912 | 7/1989 | Tanaka et al. | 382/9 |
| 4,864,628 | 9/1989 | Scott | 382/21 |
| 4,888,646 | 12/1989 | Umeda et al. | 382/9 |
| 4,918,740 | 4/1990 | Ross | 382/9 |
| 4,926,490 | 5/1990 | Mano | 382/9 |
| 4,933,977 | 6/1990 | Ohnishi et al. | 382/9 |
| 4,949,281 | 8/1990 | Hillenbrand et al. | 364/518 |
| 4,949,392 | 8/1990 | Barski et al. | 382/61 |
| 4,956,869 | 9/1990 | Miyatake et al. | 382/22 |
| 4,977,603 | 12/1990 | Irie et al. | 382/34 |
| 4,998,285 | 3/1991 | Suzuki et al. | 382/9 |
| 5,033,097 | 7/1991 | Nakamura | 382/9 |
| 5,050,224 | 9/1991 | Mori | 382/9 |
| 5,093,868 | 3/1992 | Tanaka et al. | 382/9 |
| 5,138,668 | 8/1992 | Abe | 382/9 |
| 5,142,589 | 8/1992 | Lougheed et al. | 382/9 |
| 5,214,719 | 5/1993 | Budd et al. | 382/23 |
| 5,216,725 | 6/1993 | McCubbrey | 382/9 |

FOREIGN PATENT DOCUMENTS

WO9312610 6/1993 WIPO .......................... H04N 1/411

OTHER PUBLICATIONS

"F6365 Japanese Document Reader" Fujitsu Sci. Tech. J., 26, 3, pp. 224–233 (Oct. 1990).

"An Efficiently Computable Metric for Comparing Polygon Shapes" by Arkin; Chew, Huttenlocher, Kedem & Mitchell; Proceedings of First Annual ACM-SIAM Symposium on Discrete Algorithms, Jan. 1990 (pp. 129–137).

"Comparing Images Using the Hausdorff Distance" by Huttenlocher, Klanderman and Rucklidge; Dept. of Computer Science, Cornell University, Ithaca, N.Y. 14853; CUCS TR 92-1211 (revised) Jun. 1991.

"A Multi-Resolution Technique for Comparing Images Using the Hausdorf Distance" by Huttenlocher and Rucklidge; TR 92-1321 Dec. 1992; Dept. of Computer Science, Cornell University, Ithaca, N.Y.

Primary Examiner—Joseph Mancuso
Assistant Examiner—Gerard Del Rosso
Attorney, Agent, or Firm—Duane C. Basch

[57] ABSTRACT

A method for determining the boundaries of text or character strings represented in an array of image data by shape, without a requirement for individually detecting and/or identifying the character or characters making up the strings. The method relies upon the detection of connected components within words to first determine text line boundaries and to isolate the connected components into text rows. Subsequently, the structural relationships between the components within and defining rows (i.e. overlap, inter-character spacing, and inter-word spacing), are used to further combine adjacent sets of connected components into words or similar units of semantic understanding within text rows.

36 Claims, 11 Drawing Sheets

50 — Cal.App. 1961. Police officers who had information from informants that defendant was dealing in narcotics and who knew what defendant looked like and kind of automobile he was driving and who at time they approached automobile, as another person was getting in, saw an object in left hand of defendant, who tried to drop his hand out of sight toward floorboard of automobile, had reasonable cause to believe that defendant had committed a felony, and arrest was lawful. West's Ann. Health & Safety Code, §§ 11500, 11530.— People v. Williams, 16 Cal.Rptr. 842. — 54

Cal.App. 1961. Officers had reasonable cause before they entered to believe defendant was committing a felony and that he had a narcotic unlawfully in his possession, where they observed defendant's act of throwing away capsules immediately after front door of house he entered was bolted and officer announced his presence, and arrest was lawful even though officers had no warrant.—People v. Armenta, 17 Cal.Rptr. 470.

Cal.App. 1962. Evidence disclosed that police officers, who had been informed that defendants had purchased heroin and had a narcotics record went to residence for further investigation and heard men rushing toward bathroom and the toilet flush, had probable cause to believe that a crime was being committed in their presence and entry thereafter to effect arrest was authorized and concurrent search and seizure, as incident to arrest, was lawful. West's Ann.Health & Safety Code, § 11500.—People v. Reyes, 23 Cal.Rptr. 705.

Cal.App. 1962. Conduct by a person indicating an attempt to dispose of contraband by putting it into his mouth or throwing it away is a material factor in determining probable cause for arrest without a warrant.— People v. Tabb, 25 Cal.Rptr. 541.

*FIG. 3*

METHOD FOR IDENTIFYING WORD BOUNDING BOXES IN TEXT

This invention relates to a method of determining the boundaries of text or character strings represented in an array of image data by shape, without a requirement for individually detecting and/or identifying the character or characters making up the strings.

CROSS REFERENCE

The following related applications are hereby incorporated by reference for their teachings:

"Coarse and Fine Skew Measurement," Wayner et al., Ser. No. 07/737,863, filed Jul. 30, 1991;

"Optical Word Recognition by Examination of Word Shape," Huttenlocher et al., Ser. No. 07/796,119, filed Nov. 19, 1991.

"Method for Comparing Word Shapes," Huttenlocher et al., Ser. No. 07/795,169, filed Nov. 19, 1991;

"Method of Determining Boundaries of Words in Text," Huttenlocher et al., Ser. No. 07/794,392, file Nov. 19, 1991;

"A Method of Deriving Wordshapes for Subsequent Comparison," Huttenlocher et al., Ser. No. 07/794,391, filed Nov. 19, 1991; and "Method for Comparing Token Images," Huttenlocher et al., Ser. No. 08/170,075, filed concurrently herewith.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

MICROFICHE APPENDIX

An appendix comprising 3 microfiche having a total of 260 frames thereon is included as part of this application.

BACKGROUND OF THE INVENTION

Text in electronically encoded documents (electronic documents) tends to be found in either of two formats, each distinct from the other. In a first format, the text may be in a bitmap format, in which text is defined only in terms of an array of image data or pixels, essentially indistinguishable from adjacent images which are similarly represented. In this format, text is generally incapable of being subjected to processing by a computer based on textual content alone. In a second format, hereinafter referred to as a character code format, the text is represented as a string of character codes (e.g. ASCII code). In the character code format, the image or bitmap of the text is not available.

Conversion from bitmap to character code format using an optical character recognition (OCR) process carries a significant cost in terms of time and processing effort. Each bitmap of a character must be distinguished from its neighbors, its appearance analyzed, and in a decision making process, identified as a distinct character in a predetermined set of characters. As examples of OCR techniques, U.S. Pat. No. 4,864,628 to Scott discloses a method for reading data which circumnavigates a character image. U.S. Pat. No. 4,326,190 to Borland et al. teaches a character feature detection system for reading alphanumeric characters. In addition, U.S. Pat. No. 4,956,869 to Miyatake et al. suggests a a more efficient method for tracing contour lines to prepare contour coordinates of a figure within an image consisting of a plurality of lines.

When the electronic document has been derived by scanning an original, however, image quality and noise in its reproduction contribute to uncertainty in the actual appearance of the bitmap. A degraded bitmap appearance may be caused by an original document of poor quality, by scanning error, or by similar factors affecting the digitized representation of the image. Therefore, the decision process employed in identifying a character has an inherent uncertainty about it. A particular problem in this regard is the tendency of characters in text to blur, or merge. Most character identifying processes commence with an assumption that a character is an independent set of connected pixels. When this assumption fails, due to the quality of the input image, character identification also fails. A variety of attempts have been made to improve character detection. U.S. Pat. No. 4,926,490 to Mano discloses a method and apparatus for recognizing skewed characters on a document. A rectangle is created around each character image, oriented with the detection orientation rather than the image orientation, and position data for each rectangle is stored in a table. The rectangle is created by detecting a character's outline. U.S. Pat. No. 4,558,461 to Schlang discloses a text line bounding system wherein skewed text is adjusted by analyzing vertical patches of a document. After the skew has been determined, each text line is bounded by determining a top, bottom, left, and right boundary of the text line. U.S. Pat. No. 3,295,105 to Gray et al. discloses a scan controller for normalizing a character in a character recognition apparatus wherein a character is analyzed by determining certain character characteristics including top, bottom, right and left character boundaries. U.S. Pat. No. 4,918,740 to Ross discloses a processing means for use in an optical character recognition system wherein sub-line information is used to analyze a character and identify it. U.S. Pat. No. 4,949,392 to Barski et al. discloses a document recognition system which recognizes an unknown document form by comparison against a library of templates, thus allowing for the intelligent association of text characters in certain locations of the unknown document to aid in the recognition thereof. U.S. Pat. No. 5,142,589 to Lougheed et al. discloses a system for repairing digital images of broken characters which first dilates the character strokes to fill small gaps therein and then erodes the image to conform to the original strokes, thereby producing recognizable characters before separation into individual digits for recognition. U.S. Pat. No. 5,214,719 to Budd et al. teaches a character recognition system and method for teaching and recognizing characters. The method obtains an image, identifies a character, samples the character, and then does a vector correlation of the sample points to stored points of known characters to recognize the character.

OCR methods have sought to segment images in various fashions. For example, U.S. Pat. No. 4,558,461 to Schlang suggests a text line bounding system for nonmechanically adjusting for skewed text in scanned text. The skew angle of the text is then established, following which the text lines are statistically bounded. The actual text data is then rotated according to the orientation established for conventional processing. U.S. Pat. No. 4,809,344 to Peppers et al. teaches preprocessing of character recognition so as to obtain data necessary for character recognition. Page segmentation is performed by simultaneously extracting a plurality of features, separation between lines, separation between characters, and separation between the lines and the characters are simultaneously performed, and a calculation time for normalizing the separated individual characters can be reduced, thereby performing preprocessing required for character recognition systematically at high speed.

OCR methods have sought to improve reliability by use of dictionary word verification methods, such as described in U.S. Pat. No. 4,010,445 to Hoshino. However, the underlying problem of accurate character detection of each character in a character string remains. The article "F6365 Japanese Document Reader" Fujitsu Sci. Tech. J., 26, 3, pp. 224–233 (October 1990) shows a character reader using the steps of block extraction, skew adjustment, block division, adjacent character segmentation, line extractions, and character recognition by pattern matching, with dictionary checking, and comparison.

It might be desirable, to identify a set of characters forming a word or character string as such, as shown, for example, in U.S. Pat. No. 2,905,927 to Reed, in which for a text string, a set of three scans across the text, parallel to its reading orientation are employed, each scan deriving information about transitions from black to white across the scan. U.S. Pat. No. 4,155,072 to Kawa suggests a similar arrangement, operable to produce a set of values representative of the leading and trailing edges of the character.

In addition to an OCR system operating on printed or typed textual images, numerous references deal with recognition of handwritten text which has been converted into an electronic representation. U.S. Pat. No. 4,731,857 to Tappert shows processing a word with the segmentation and recognition steps combined into an overall scheme. U.S. Pat. No. 4,764,972 to Yoshida et al. suggests a recognition system for recognizing a plurality of handwritten characters. U.S. Pat. No. 4,933,977 to Ohnishi et al. discloses a method for identifying a plurality of handwritten connected figures, including identifying and prioritizing branches of the connected figures. Finally, U.S. Pat. No. 5,216,725 to McCubbrey teaches a computer system for mail sorting of hand-addressed envelopes that first calculates an interstroke distance for character strokes within a digitized address and then, using the interstroke distance, the strokes are grouped into words for further processing.

The choice of entire words as the basic unit of recognition, has also been considered in signature recognition, where no attempt is made to maintain characters as having separate identities, and is suggested by U.S. Pat. No. 3,133,266 to Frishkopf, which still relies on subsequent feature identification methods for identifying characteristics of the image of the character. Signature recognition has also used comparison techniques between samples and known signatures, as shown in U.S. Pat. No. 4,495,644 to Parks et al. and U.S. Pat. No. 4,701,960 to Scott which suggest that features plotted on x-y coordinates during the signature process can be stored and used for signature verification.

Alternative modes of expressing character recognition are known, U.S. Pat. No. 4,949,281 to Hillenbrand et al. teaches the use of polynomials for generating and reproducing graphic objects, where the objects are predetermined in the form of reference contours in contour coordinates.

Certain signal processing techniques for comparing known signals to unknown signals are available if the word can be expressed in a relatively simple manner. U.S. Pat. No. 4,400,828 to Pirz et al. discloses a spoken word recognizor wherein an input word is recognized from a set of reference words by generating signals representative of the correspondence of an input word and the set of reference words and selecting a closest match. U.S. Pat. No. 4,977,603 to Irie et al. teaches an arrangement for pattern recognition utilizing the multiple similarity method, capable of taking structural features of a pattern to be recognized into account, so that sufficiently accurate pattern recognition can be achieved even when the pattern may involve complicated and diverse variations. "An Efficiently Computable Metric for Comparing Polygon Shapes," by Arkin, Chew, Huttenlocher, Kedem and Mitchell, *Proceedings of First Annual ACM-SIAM Symposium on Discrete Algorithms*, January 1990 (pp. 129–137) suggests that metrics can be established for shape matching.

SUMMARY OF THE INVENTION

In accordance with the present invention, there is provided a method of extracting at least one word object within rasterized data defining an image. The method comprises the steps of: (a) finding the connected components within the image; (b) identifying boundaries about each group of connected components within the image; (c) locating text rows using the boundaries identified in step (b); and (d) combining adjacent groups of connected components within the text rows located in step (c), based upon a relationship between the boundaries of the adjacent groups, so as to segment the image by word objects.

In accordance with another aspect of the present invention, there is provided a method of eliminating noise within rasterized data defining an image consisting primarily of textual information. The method includes the steps of: (a) finding the connected components within the image; (b) identifying boundaries about each group of connected components within the image; (c) locating text rows using the boundaries identified in step (b); (d) combining adjacent groups of connected components within the text rows located in step (c), based upon a relationship between the boundaries of the adjacent groups, so as to define the boundaries of word objects; and (e) characterizing all groups of connected components not falling within the boundaries of word objects as noise so that they may be eliminated from the image.

The present invention seeks to avoid the problems inherent in segmentation methods employed by OCR techniques, while utilizing the fundamental characteristics of words and text strings. Specifically, the signal to noise ratio inherent in image derivation, or the imaging process, is relatively small for a character, but relatively large compared to a larger character string. Moreover, word-to-word spacing tends to be larger than character to character spacing, and therefore, allows improved isolation and identification of character strings as compared to identification of individual characters. OCR methods also tend to require several correct decisions about aspects of a character preparatory to a correct identification, including identification of portions of the character as ascenders, descenders, curves, etc., all of which are fallible. Moreover, the present invention facilitates more reliable identification and recognition of words. Identification of word boundaries in accordance with the present invention, initially requires determination of the characteristics of the text or symbol lines within the image. Subsequently, comparison of the words isolated within the boundaries to one another or to known words may be completed. Hence, assumptions about the word are not made until the comparisons occur, thereby eliminating the impact of invalid character based assumptions which may cause subsequent erroneous comparisons and decisions.

In examining potential uses of computer processed text, it has been determined that, at least in certain cases, deriving each letter of the word is not required for processing requirements. Thus, for example, in a key word search of a text image, rather than converting, via OCR techniques, each letter of each word, and subsequently determining from the possibly flawed character coding whether one or more key words are present, a computer might instead generate and compare the shapes of words within the text image with the shape of the key word, and evaluate whether the key word is present by shape. The output of such a system would most likely present an indication of the presence of the key words to an accuracy acceptable to a user. Furthermore, it is believed that the novel method described herein will have processing speed advantages over OCR methods. Moreover, the present invention may also have applications in image editing systems and is, therefore, not intended to be limited to the embodiment described.

The probability of an incorrect determination of a letter by OCR methods may be relatively low, however, the probabilities are multiplicatively cumulative over an entire word—applying the product rule. Hence, using OCR to convert words into character code strings, prior to searching for or recognizing the words may result in considerable error. The present invention utilizes word level segmentation of the image data to enable subsequent word recognition in a manner similar to that which humans use while reading or skimming a text passage. Moreover, the described word shape recognition process has several advantages. First, the bitmap image data is not irretrievably lost, and a reasonable representation of the bitmap remains so that a user may examine a reconstructed bitmap for word determination, if desired. Secondly, by utilizing complete words, each letter has the context of the word to assist in the word's comparison to other word shapes. The presence of a poorly formed letter in a word only minimally affects the total identifiability of the word shape, by only slightly decreasing the probability of a match between two compared images of the word. Thirdly, small words, which have the greatest probability of false recognition in the present invention, generally have the lowest information content. Accordingly, the words in which errors are most likely to occur are the words which are of least importance in an information content sense. In addition, when considered in comparison with the performance of OCR methods, which are more likely to result in mistakes for words having more characters, the present invention generally enables a more robust word recognition capability.

OCR methods convert from a bitmap to a representative character code, thereby losing the informational content of the bitmap. In general, the process is not reversible to obtain the original bitmap from the character code. However, identification of words based on shape, as described in accordance with the present invention, retains bitmap information further into the recognition process, thereby enabling reconstruction of the bitmap.

BRIEF DESCRIPTION OF THE DRAWINGS

Other objects and advantages of the present invention will become apparent from the following description taken together with the drawings in which:

FIG. 3 shows an image sample of example text over which the inventive process will be demonstrated;

The Appendix contains source code listings for a series of image manipulation and signal processing routines which have been implemented to demonstrate the functionality of the present invention. Included in the Appendix are three sections which are organized as follows:

Section A, beginning at page 1, comprises the declarative or "include" files which are commonly shared among the functional code modules;

Section B, beginning at page 72, comprises code listings for various functions which are used to determine word boundaries in accordance with a preferred embodiment of the present invention, some of which are further described in the following description;

Section C, beginning at page 185, comprises code listings for various functions for the word shape comparison operations that are the subject of copending application Ser. No. 08/170,075, and which are generally described in the following description.

Figure 1:
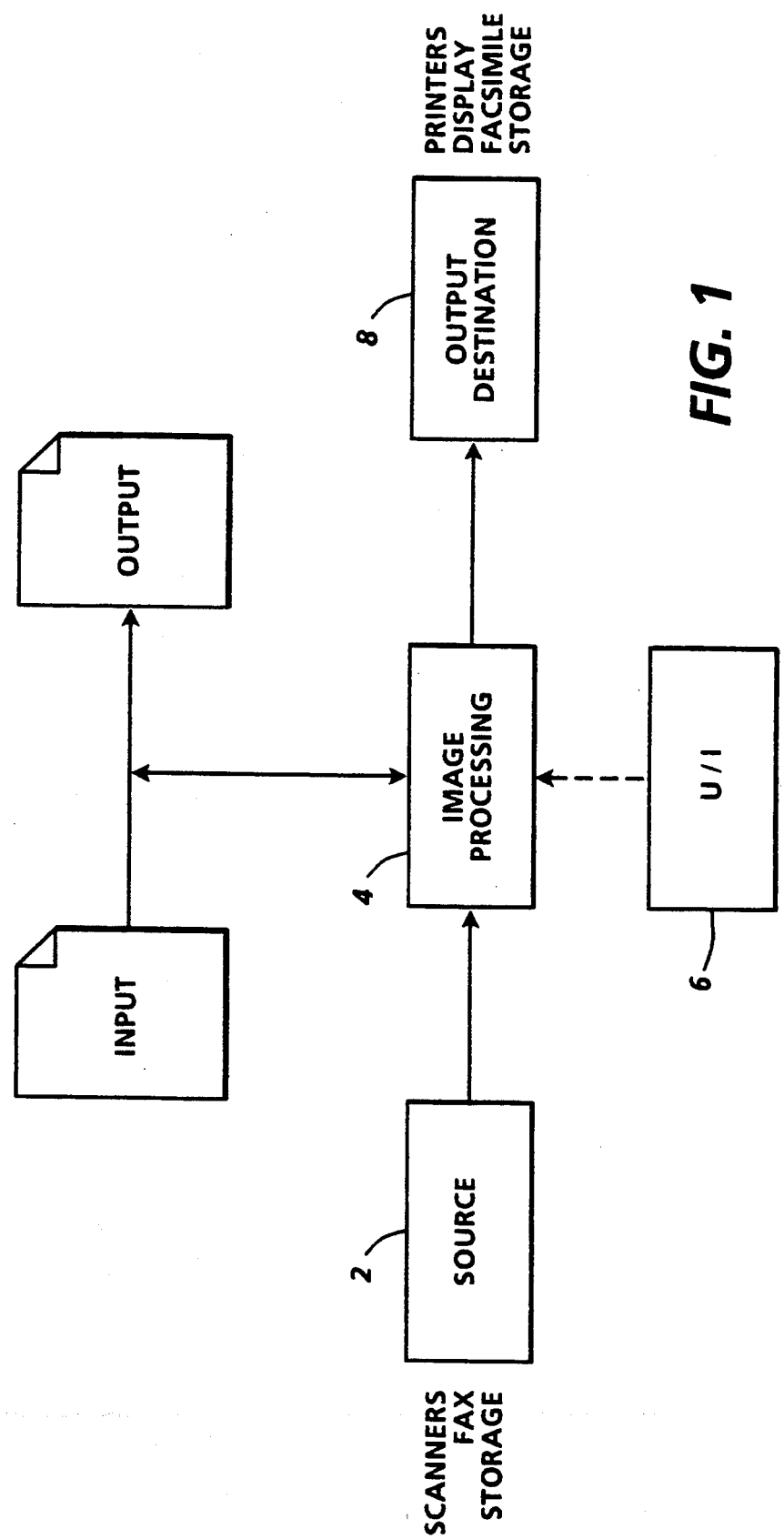
FIG. 1 shows a generalized system diagram of an image processing system in which the present invention would find use.

Referring now to the drawings where the showings are for the purpose of illustrating a preferred embodiment of the invention, and not for limiting same, FIG. 1 shows a generalized image processing system, which covers numerous situations in which the present invention may find advantageous use. Generally, a source image may be derived from a source image derivation system 2, which may be a scanner, facsimile device, or storage system. The source image is forwarded to a computer processing device 4 which may be any of several well known devices including the inventive device described herein. In response to commands entered at user interface 6, processing device 4 produces an output at an output device 8, which may be a printer, display, facsimile device or other storage device. In essence, as is shown in the upper portion of FIG. 1, an input document is directed into a system and an output document is retrieved from it.

In the following description, an image is generally described as an image bitmap, where an image is represented as a plurality of rasterized image signals. These signals, commonly referred to as pixels, are typically denoted as black when intended to represent a corresponding mark or active position on a document from which they were produced. However, these constructs have been used to enable the description of the present invention, and are in no way intended to limit the domain of such to black-and-white or binary images. Rather, the present invention is general applicable across a broad range of image representation techniques. Moreover, the present invention for determining word boundaries may also have applications in image editing systems and is, therefore, not intended to be limited solely to the embodiment hereinafter described.

Figure 2:
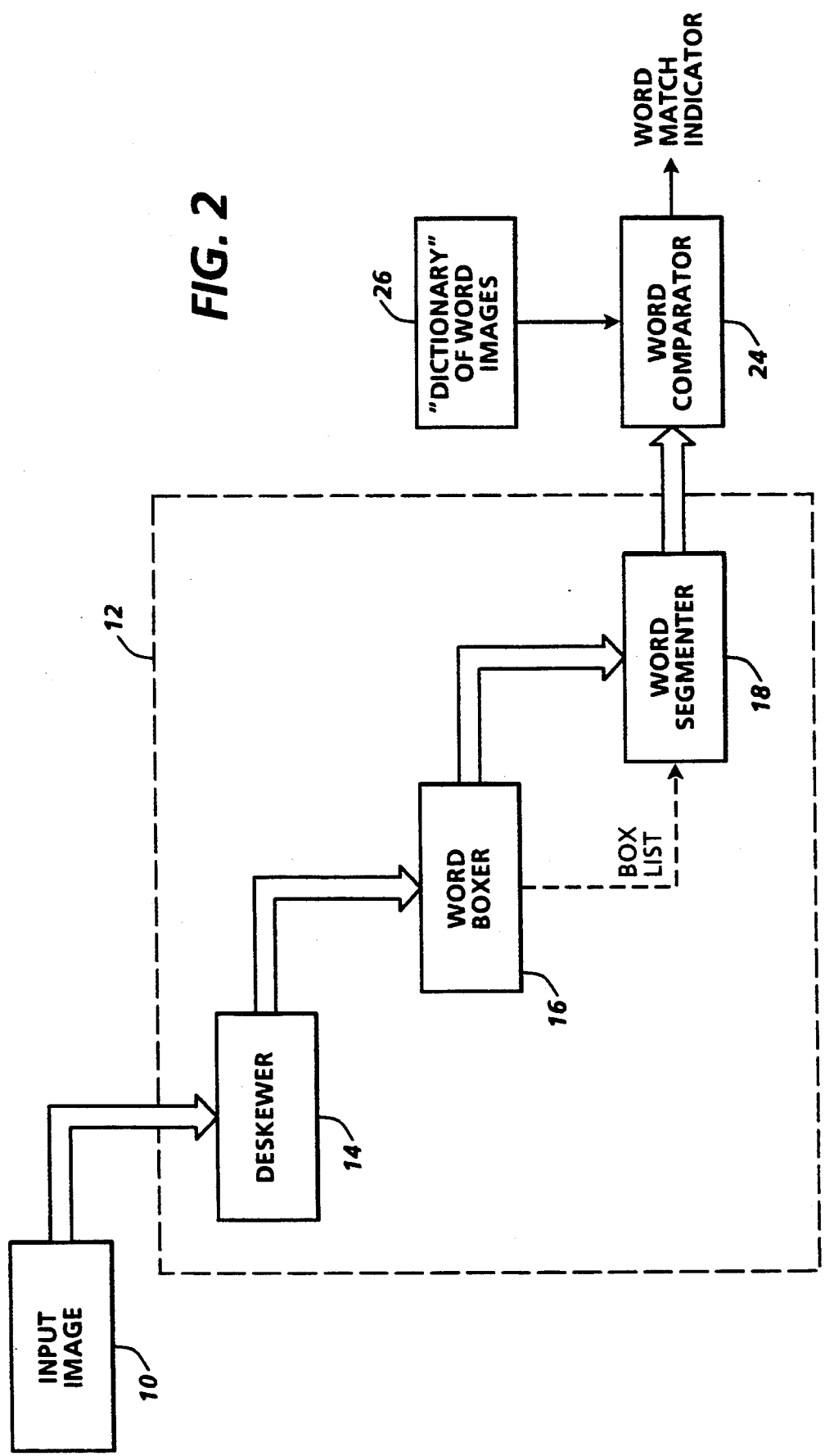
FIG. 2 shows a block diagram of the arrangement of system components forming one embodiment of the inventive word image recognition system.

FIG. 2, shows a system which embodies the present invention for determining, segmenting, and comparing words in terms of their shapes. It will, of course, be recognized that each element of the system may be many devices, or may simply be a program operated within a single device. Beginning with an input bitmap 10, whose source is indeterminate, and not part of the invention, a bitmap is initially directed to a segmentation system 12, in which boundaries of words, or character strings, or other multi-character units of understanding, will be determined. Initially, the image bitmap passes through deskewer 14, which determines the angle of orientation of text in the image and corrects for the orientation. Using the deskewed image produced by the deskewing operation, at word boxer 16, the boundaries of word objects (i.e., words, character strings) are determined, so that along with word boundaries, boundaries of lines of text within the image are also identified. At word segmenter 18, the word boundaries are applied to the image bitmap so that each word group in the image may be isolated in reading order and subsequently treated as a single unit. As used herein, "word," "symbol string" or "character string" refer to a set of connected alphanumeric or punctuation elements, or more broadly, signs or symbols which together form a single unit of semantic understanding. Such single units of understanding are characterized in an image as separated by a spacing greater than that which separates the adjacent elements, signs or symbols forming the unit. At this point, alternative applications for the present invention, for example text or word editing systems, may employ the isolated word shapes for subsequent manipulation of the image. Hence, the present invention is not solely limited to use in a word recognition context.

Thereafter word shape comparator 24 compares a word shape representing the individual words in the image with known or previously identified word shapes from a dictionary 26. In an alternative embodiment word shape comparator 24 may be used to compare two or more word shapes determined from image 10. In a preferred embodiment, comparator 24 employs a variant of the Hausdorff distance measure to characterize the degree of resemblance between the word shapes being compared. More importantly, word shape comparator 24 is not limited to the comparison of word shapes from unrecognized strings of characters to known word shapes. In a simplified context, comparator 24 is merely an apparatus for comparing one word shape against another to produce a relative indication of the degree of similarity between the two shapes, represented by the word match indicator output.

Figure 4:
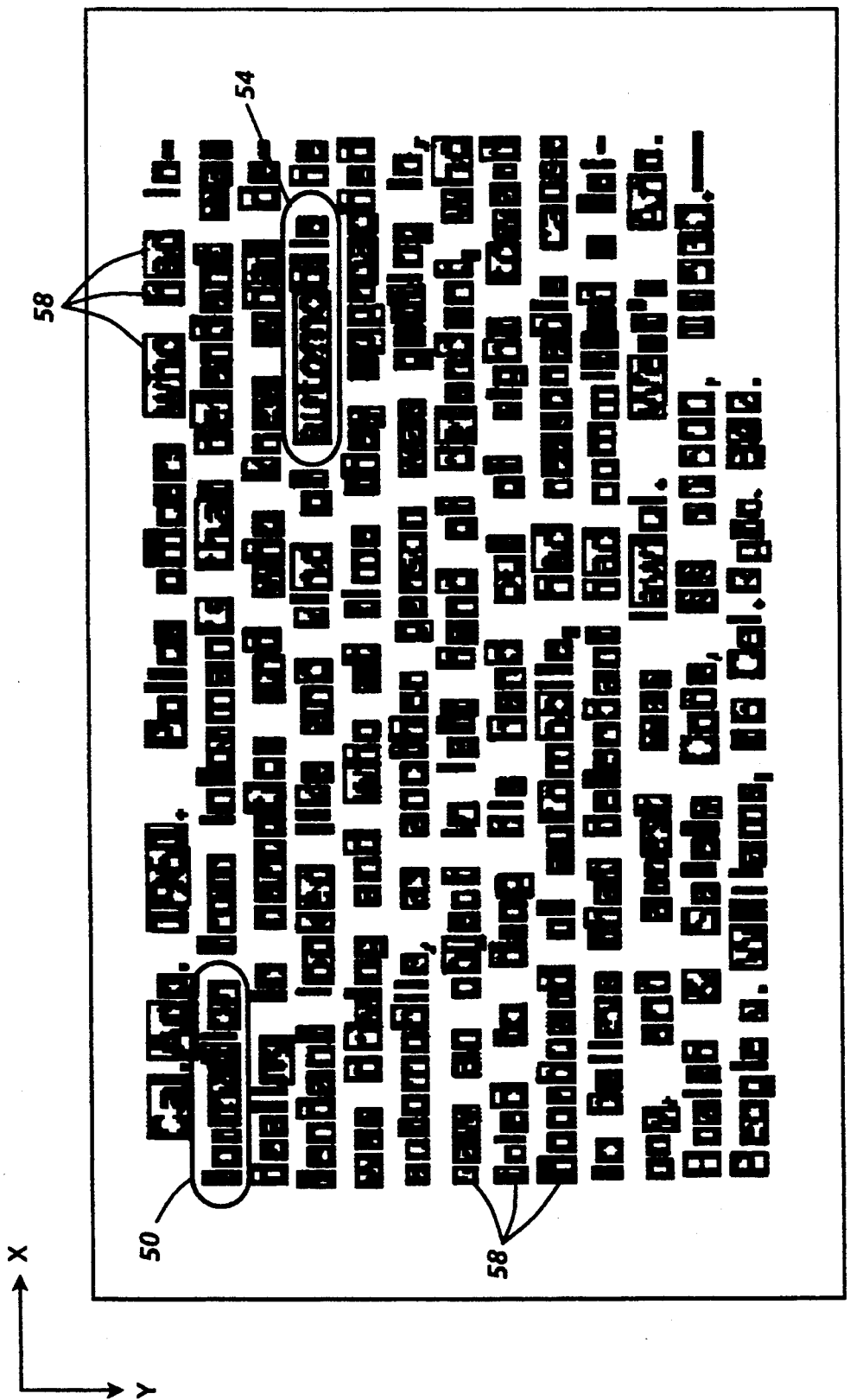
FIGS. 4, 5, and 6 illustrate portions of a scanned image of the example text at various stages of processing in accordance with the present invention.
Figure 5:
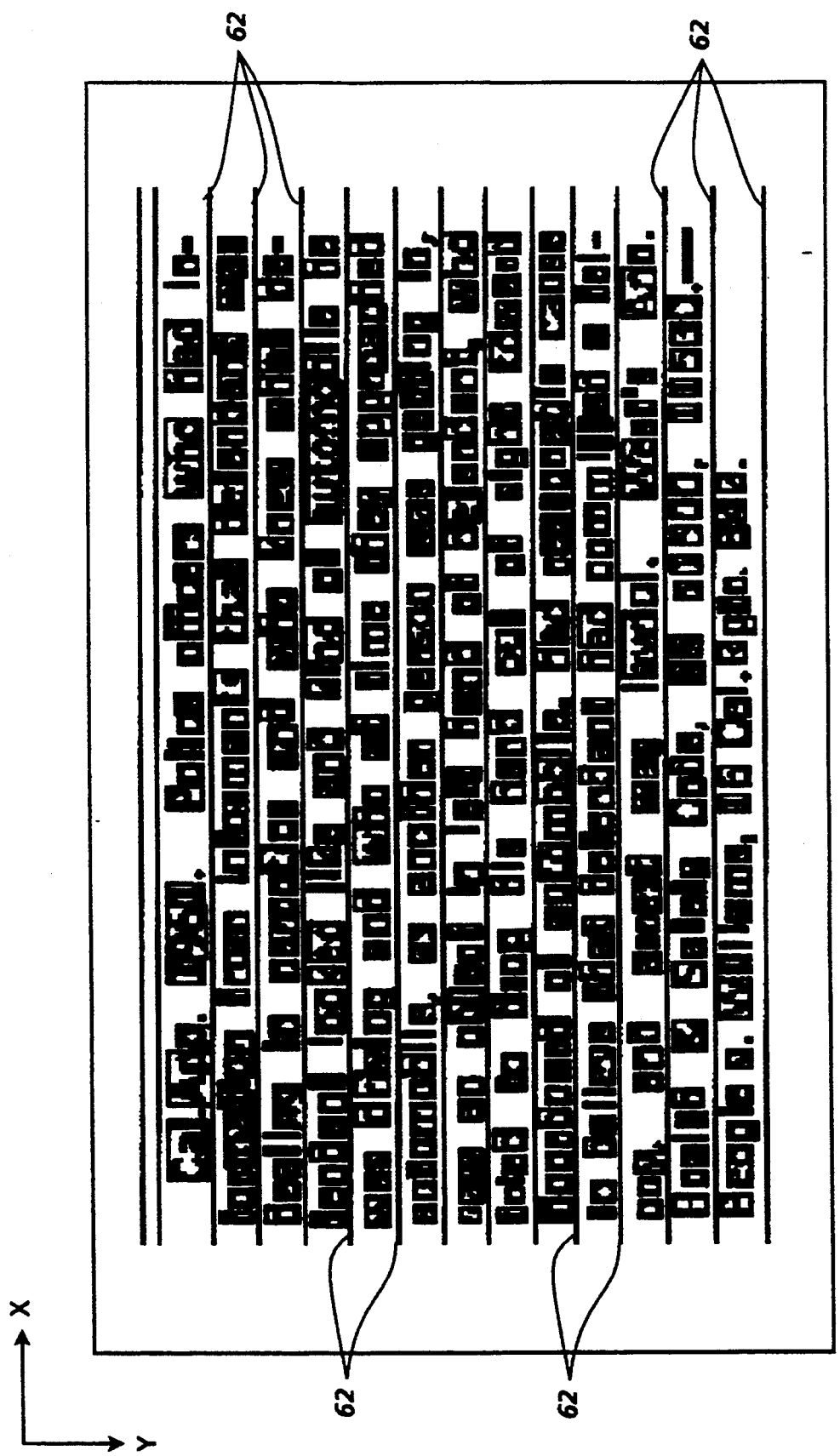
Figure 6:
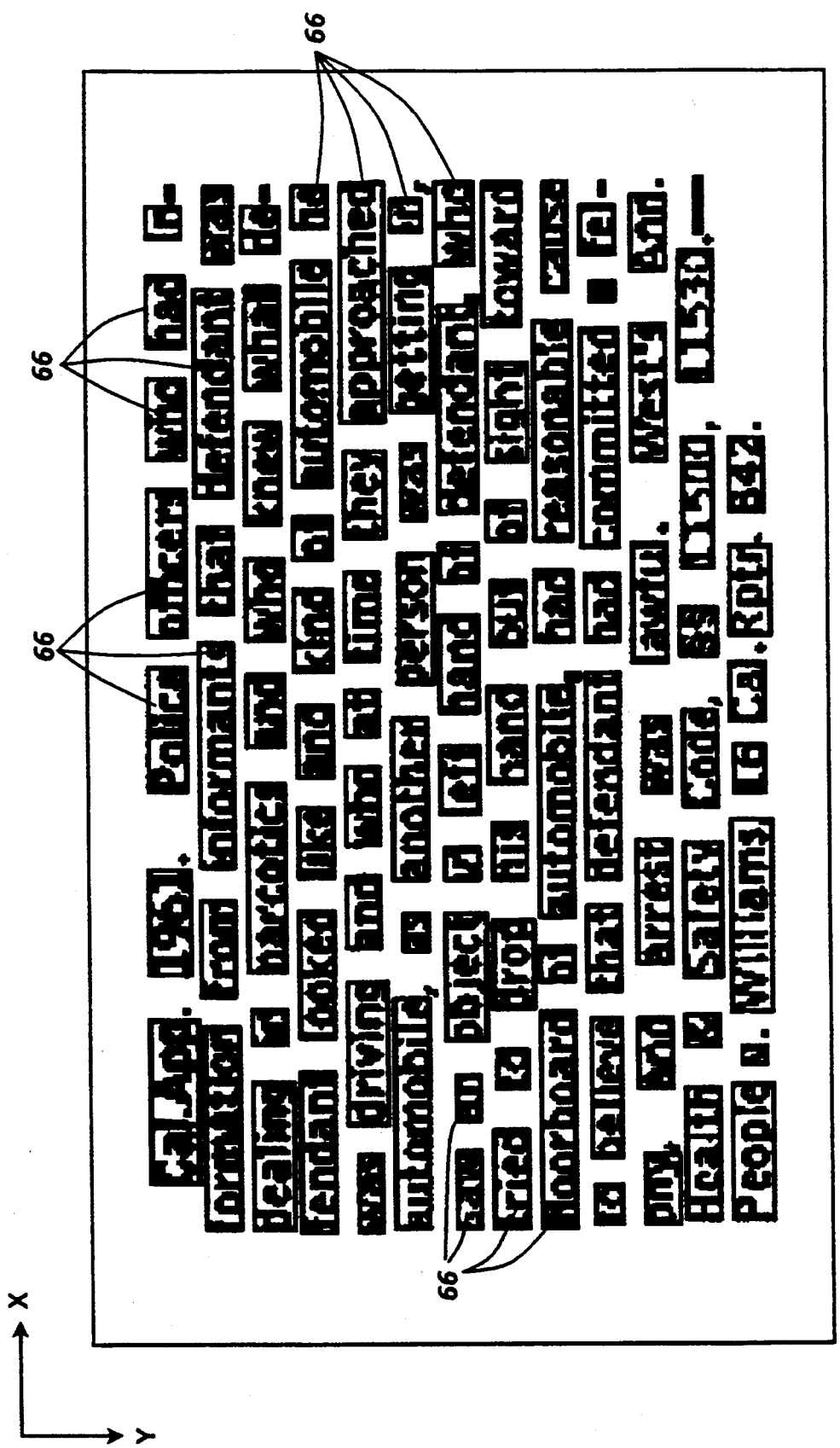

Having defined the general method and apparatus for determination and comparison of word shapes, each step will now be more completely described. To further demonstrate the process of the invention, at FIG. 3, a sample image, taken from a public domain source is shown, having several lines of text contained therein. FIG. 3 demonstrates approximately how the image would appear on the page of text, while FIGS. 4, 5, and 6 show a portion of a scanned image of the page, which demonstrates an enlargement of the image of a bitmap that would present problems to known OCR methods. Looking at FIG. 3, for example, the image of word 50 "formation" in the second line and the image of word 54 "automobile" in the fourth line of the text image, it may be seen that several of the letters run together.

In one possible embodiment of the invention, deskewer 14, may incorporate elements described in the United States Patent application for "Coarse and Fine Skew Measurement," Ser. No. 07/737,863 by Wayner et al., which has been previously incorporated by reference, to determine the amount of skew present in the input image 10. Subsequently, any number of commonly known small-angle image rotation or skew correction methods may be employed to obtain a deskewed representation of the image.

Figure 7:
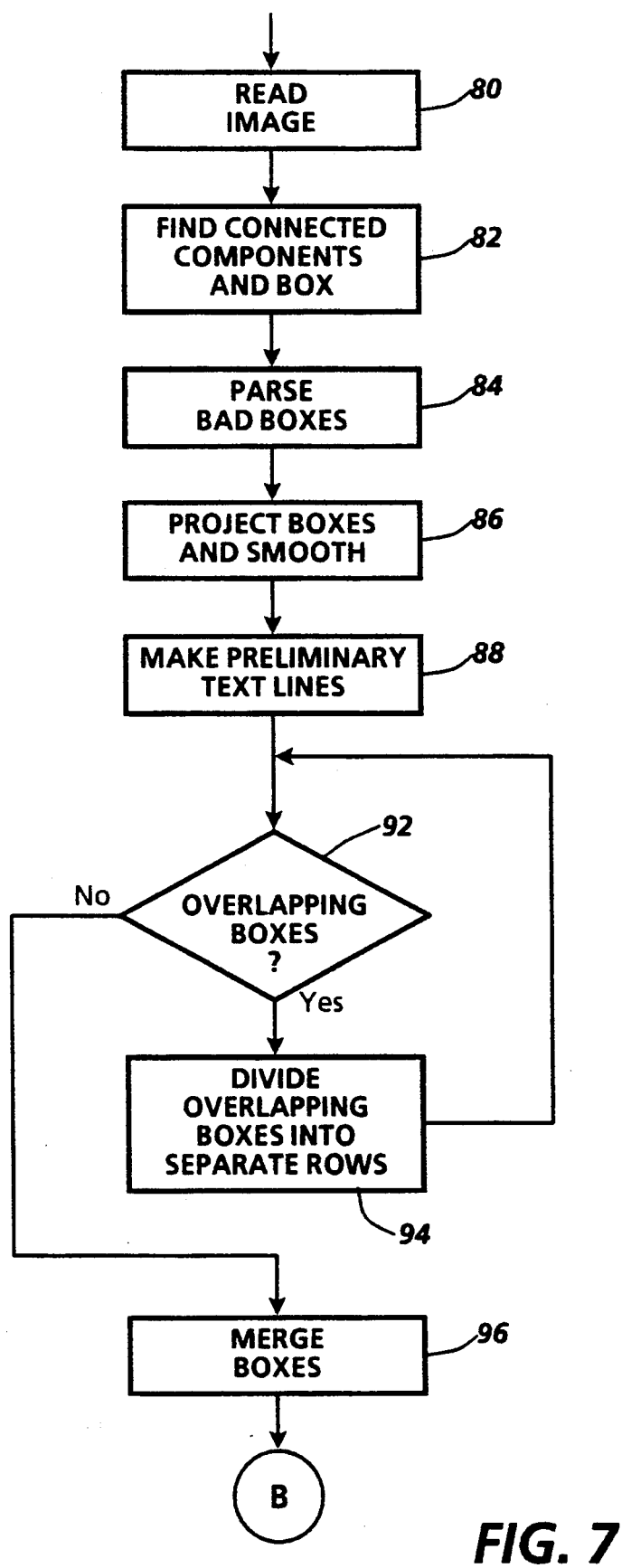
FIGS. 7 and 8 are flowcharts illustrating the process used to determine word boundaries within an image.
Figure 8:
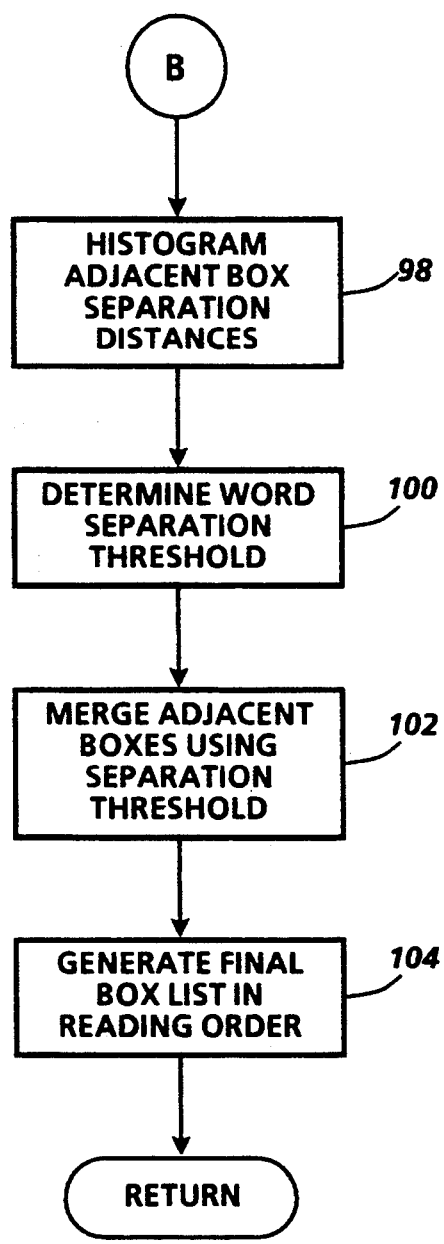

In the next process step, word boxer 16 operates on the deskewed image in accordance with the process steps depicted in the flowcharts of FIGS. 7 and 8. Although the following description of the process steps executed by the word boxer will be described with respect to operations executed by a programmable computer, there is no intent to limit the instant invention to such an embodiment. Beginning at step 80, the word boxer first reads in the input image of FIG. 3, having been deskewed if necessary by deskewer 14, using the function PackedReadFromPBM beginning on page 130 of the Appendix. The function simply accesses an image stored in memory, for example on a hard disk or similar storage device, and copies the image into a memory location allocated for the image, assigning pointers to the image as necessary.

Once the image has been retrieved, step 82 locates the connected components within the image. This process simply looks for a black pixel within a stored binary image. Once a black pixel is found an iterative process continues to locate all neighboring black pixels, and their neighboring black pixels, and so on, until the extent of the connected pixels is determined. More specifically, an eight-neighbor connection definition is employed. That is, if a pixel is adjacent to another pixel in one of its eight compass directions, then they are considered adjacent and will end up in the same connected component. Furthermore, this process is repeated until all black pixels within the image have been properly associated with other black pixels to form connected components. As illustrated in FIG. 4, once connected pixels are associated, a rectangular box or boundary 58 is identified which represents the maximum extents of the connected pixels, the rectangular box being oriented along the x-y axes of the image. Further details of the process may be found in the function FindCCBoxes beginning on page 116 of the Appendix.

In an alternative embodiment, a copy of the original image may be produced using a dilation operation so as to cause the black pixels representing letters or symbols of a word to become connected to one another while not dilating the image so much as to cause the connection of adjacent words within the image. Then, using the dilated image, it would be possible to find connected components which make up the individual words. Unfortunately, the drawbacks of this method are that the speed of the dilation operation is a function of the amount of dilation and may require substantial processing time. Also, application of a single dilation threshold (e.g., the same amount of dilation applied to the entire image) may be too general and could cause undesirable connections between unrelated strings of symbols. Preferably, the amount of dilation to be applied to a portion of an image would be determined on a line by line basis as a function of the spacing characteristics for connected components.

Figure 9:
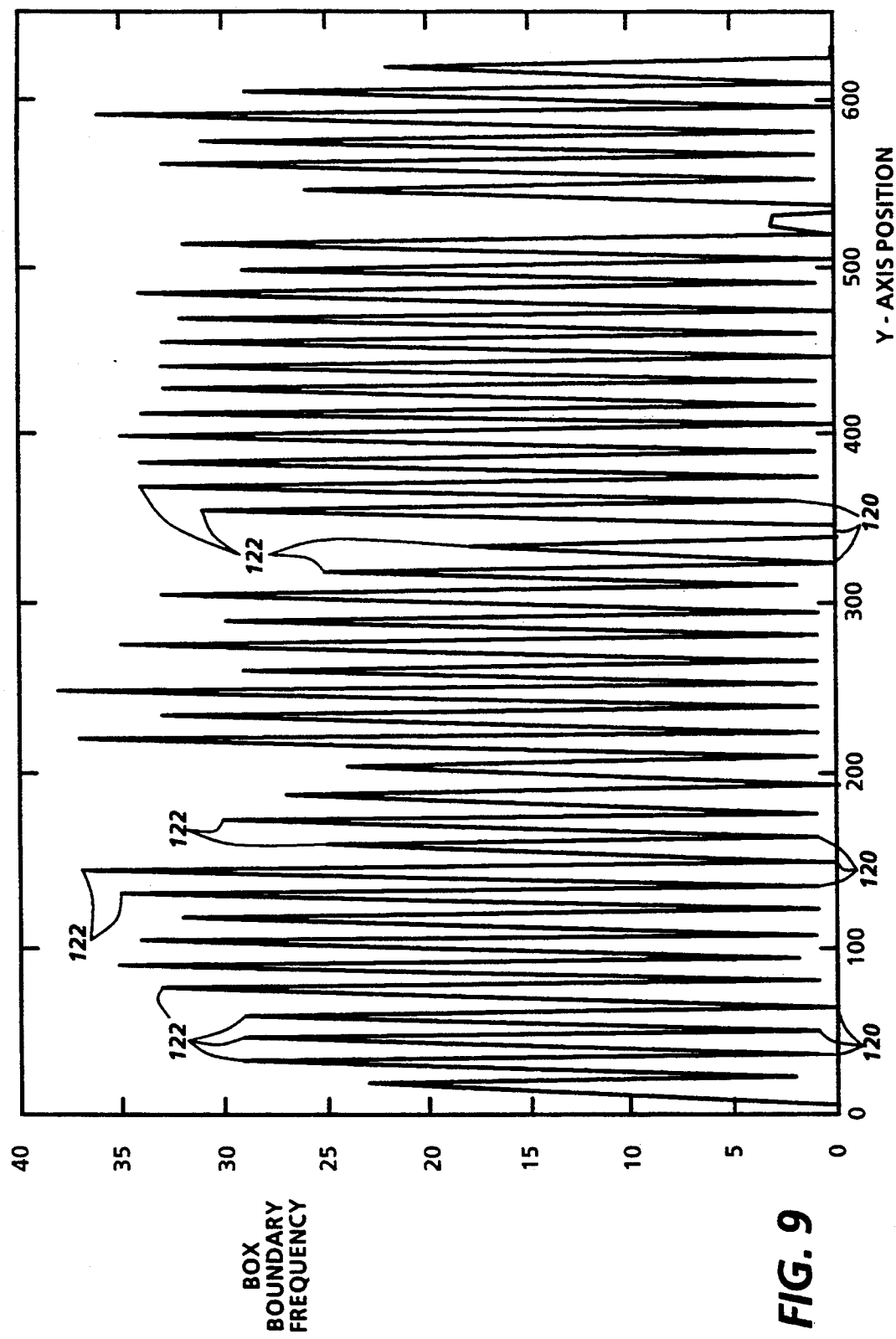
FIG. 9 is a graphical illustration of histogram data generated by step 86 of FIG. 7.

Having established bounding boxes around all connected component groups in the image, as illustrated by the portion of the image depicted in FIG. 4, the word boxer then parses out the "bad" boxes (not shown) within the identified set of connected component boxes or boundaries. Bad boxes are characterized in the function listing for ParseBadBoxes beginning on page 72 of the Appendix as: (a) tall boxes having heights greater than about twenty percent of the total image height, and greater than about a ninetieth percentile height for boxes within the image; or (b) short boxes having a height less than approximately one-third of the ninetieth percentile height. Once parsed, the remaining boxes are then projected onto the vertical or y-axis of the image (assuming the y-axis is the axis perpendicular to the direction of the deskewed text lines) using the function GetYProjections (Appendix p. 79) to generate a histogram which reflects the number of box boundaries as a function of position along the y-axis, as illustrated in FIG. 9 for the entire image of FIG. 3. In a preferred embodiment, a Gaussian smoothing operation (IntSmooth) may be applied to the y-axis projection histogram data prior to determining the text line locations. Then, from the resulting histogram, preliminary line or row boundaries can be identified as points along the y-axis of the image where valleys are present in the histogram. For example, as illustrated in FIG. 9, valleys or minima 120 are identifiable between adjacent peaks or maxima 122, and the valleys 120 thereby identify the positions of the interline spaces, illustrated by reference numeral 62 in FIG. 5. This operation is carried out by the *MakeRows function, the listing for which begins on page 82 of the Appendix, and is represented by step 88. Finally, when the preliminary text lines or rows are determined, the function PutBoxesInRows (Appendix p. 85) is executed to assign all connected component boxes to specific rows.

Having made a preliminary determination of the locations of the text lines or rows 62 the procedure MakeWordsAndSort (Appendix p. 77) is executed and initially assigns those connected component bounding boxes lying across two rows to a particular row. As reflected by steps 92, 94 and 96 of the flowchart, this procedure begins by further checking the validity of the preliminary text line identifications made in the previous step, step 88. First, the function CheckRow, found beginning on page 114 of the Appendix is executed to ensure that no text row divisions have been missed, as will now be described. Generally, in looking at the connected components, none of the projections within a text row should overlap significantly in an x-axis projection, unless they also overlap significantly in the y-axis projection. If the projections overlap, as identified by step 92, it would indicate that the identified row is quite probably two (or more) separate rows, and should be divided by finding another minimum in the y-axis projection graph. Also, boxes around small groups of connected components, such as those forming a dot over an "i" or underlining of a word within the text image must be ignored so as not to falsely trigger a further division of the text row.

Second, as represented by step 96, the remaining boxes which overlap one another along the x-axis direction are merged into a single box having a boundary enclosing the components which were merged. The merging procedure, MergeOverlaps, is found beginning on page 105 of the Appendix. In general, the process looks through boxes within a row, and identifies those boxes which overlap in the x-direction that also have at least some minimal overlap in the y-direction. Preferably the minimum y-direction overlap must be on the order of about fifty percent. For example, the scanned image might contain the word "fort". Upon scanning, the right-most side of the "f" box could overlap with the left-most side of the "o" box, thus when merging components for which boxes overlap along the x-axis the "f" and "o" boxes would be merged. The procedure also executes a size test, wherein boxes which are smaller than a predetermined size are not merged. Subsequently, the smaller boxes can serve to identify noise within the image which may be eliminated.

Figure 10:
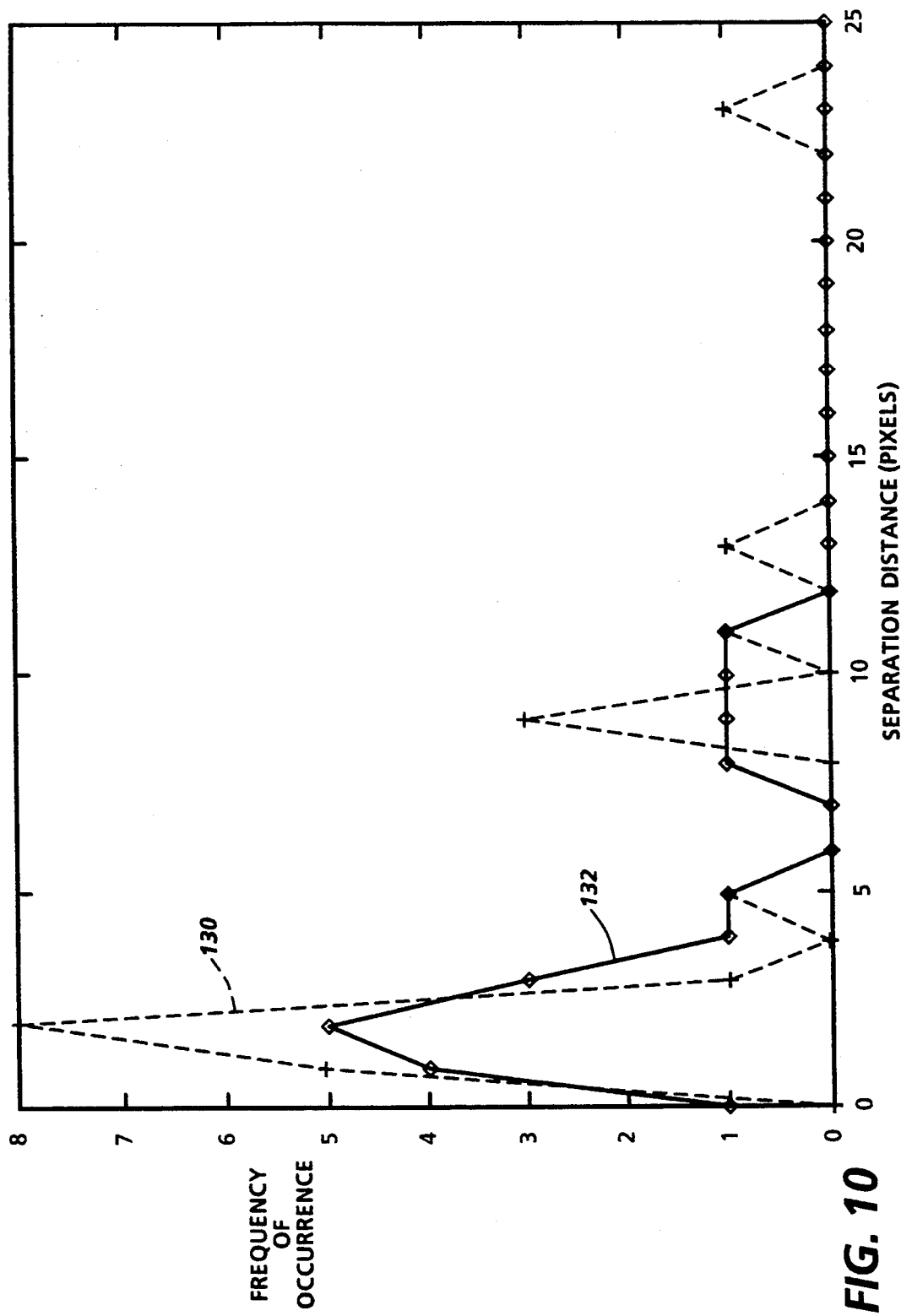
FIG. 10 is a graphical illustration of histogram data generated by step 98 of FIG. 8.

Third, having accurately located the text rows, the remaining boxes within the rows represent sets of connected components, some of which may need to be further combined to form words or similar elements of semantic understanding. To further merge adjacent components which form a word within the scanned image, the MakeWordsAndSort procedure continues at step 98 by histogramming the separation distances between adjacent components with the text rows. The results of a typical text row distribution are shown in FIG. 10, where the dashed-line curve represents the raw histogram data and the solid-line curve represents data which has been smoothed. As would be expected, the resulting curve generally shows a bi-modal distribution, where the first set of peaks 130 and 132 reflect the distribution of separation distances for the inter-character spacings, while the second set of peaks reflect the wider, and less frequent, separations between adjacent words. In addition, under certain circumstances a unimodal distribution may be produced; treatment of such being further clarified in the Appendix. As the code listing for the function RowXThresh, beginning on page 168 of the Appendix, specifies the two maximums of the bi-modal distribution are used to first identify a threshold separation, step 100, which is used to subsequently classify inter-character versus inter-word separations.

Using the separation threshold, the procedure MergeWords is then called to merge adjacent boxes within a text row which have a separation in the x-direction of less than the separation threshold, step 102 of FIG. 8. Simply put, the MergeWords procedure (Appendix p. 107) merges all adjacent sets of connected components in each row that are separated by a distance less than the separation threshold. Upon merging adjacent characters within words, the resulting box structure will reflect the boundaries of words within each of the text rows as illustrated, for example, by boxes 66 around the words in FIG. 6. At this point, control is returned to the BoxPage function where an optional operation to eliminate the small non-merged boxes which identify noise within the image may be removed using the KillNoise function beginning on page 79 of the Appendix. Subsequently, the BoxPage function calls the procedure WriteBoxList (Appendix p. 93) to generate a list of box coordinates in reading order (top-to-bottom and left-to-right within each text row), step 104. Each set of coordinates within the box list defines a bounding box 66 which surrounds a word, picture, punctuation mark, or similar unit of semantic understanding within the input image.

Returning now to FIG. 2, once word boxer 16 has generated the box list which represents the boundaries of words within the image, the box list and bitmap image are passed to the word segmenter 18. In general, word segmenter 18 is an image processing system which is capable of dividing the bitmap of input image 10 into a series of smaller bitmap images in accordance with the word boundaries specified in the box list. The output from word segmenter 18 would be a series of bitmap images, each image containing the bitmap representation of a word or similar unit of semantic understanding as identified by the word boxer 16. In a preferred embodiment, word segmenter 18 does not actually generate a separate bitmap for each portion of the input image which is bounded by a word box. Rather, the segmenter simply operates to "window" out or select a portion of the bitmap so as to allow access to the portion of the image defined as being within the boundaries of a particular box. As previously described, the output of word segmenter 18 is passed to word comparator 24 where the word is compared to another bitmap image to determine if there is a match between the image output by segmenter 18 and a word supplied from dictionary 22.

The details of the word comparator are more fully described in "Method for Comparing Word Images," by Huttenlocher et al., Ser. No. 08/170,075, hereby incorporated by reference for its teachings. As described therein, a preferred method of comparing the word images employs a Hausdorff distance measuring technique which is related to that described by Huttenlocher et al. in "Comparing Images Using the Hausdorff Distance" (TR 91-1211) June 1991, and "A Multi-Resolution Technique for Comparing Images Using the Hausdorff Distance" (TR 92-1321), December 1992, both published by the Department of Computer Science, Cornell University and hereby incorporated by reference for their teachings. Alternative methods for comparing wordshapes may also be found in "Method for Comparing Word Shapes," by Huttenlocher et al., Ser. No. 07/795,169, filed Nov. 19, 1991, previously incorporated herein by reference.

In general, the method of comparing the boxed word images utilizes a two-stage process for comparison of the connected components identified to particular boxes. As used herein, the two image sections which are to be compared are referred to as box1 and box2. These image sections may be two sections from the same image, sections from different images, or a section from an image and a section created electronically from an input string of characters or a word. Although represented as a "dictionary" in FIG. 2, the purpose of block 26 is to provide the image section (box2) to which another image section (box1) is to be compared. Having identified the box1 and box2 sections, the existing image section for each will be referred to as the "model" and a dilated version of the model, referred to hereafter as the "image," will be produced. Generally, the comparison technique employed by comparator 24 first compares pixels within model1, the original pixels in the section bounded by box1, with pixels within image2, the dilated representation of the pixels represented by box2, and a first metric is generated from the comparison. Similarly, the process is then reversed, comparing pixels within model2, the original pixels in the section bounded by box2, with pixels within image1, the dilated representation of the pixels represented by box1, and a second metric is generated from the comparison. Subsequently, the two metrics are processed to determine the degree of similarity between the two image sections bounded by box1 and box2.

Figure 11:
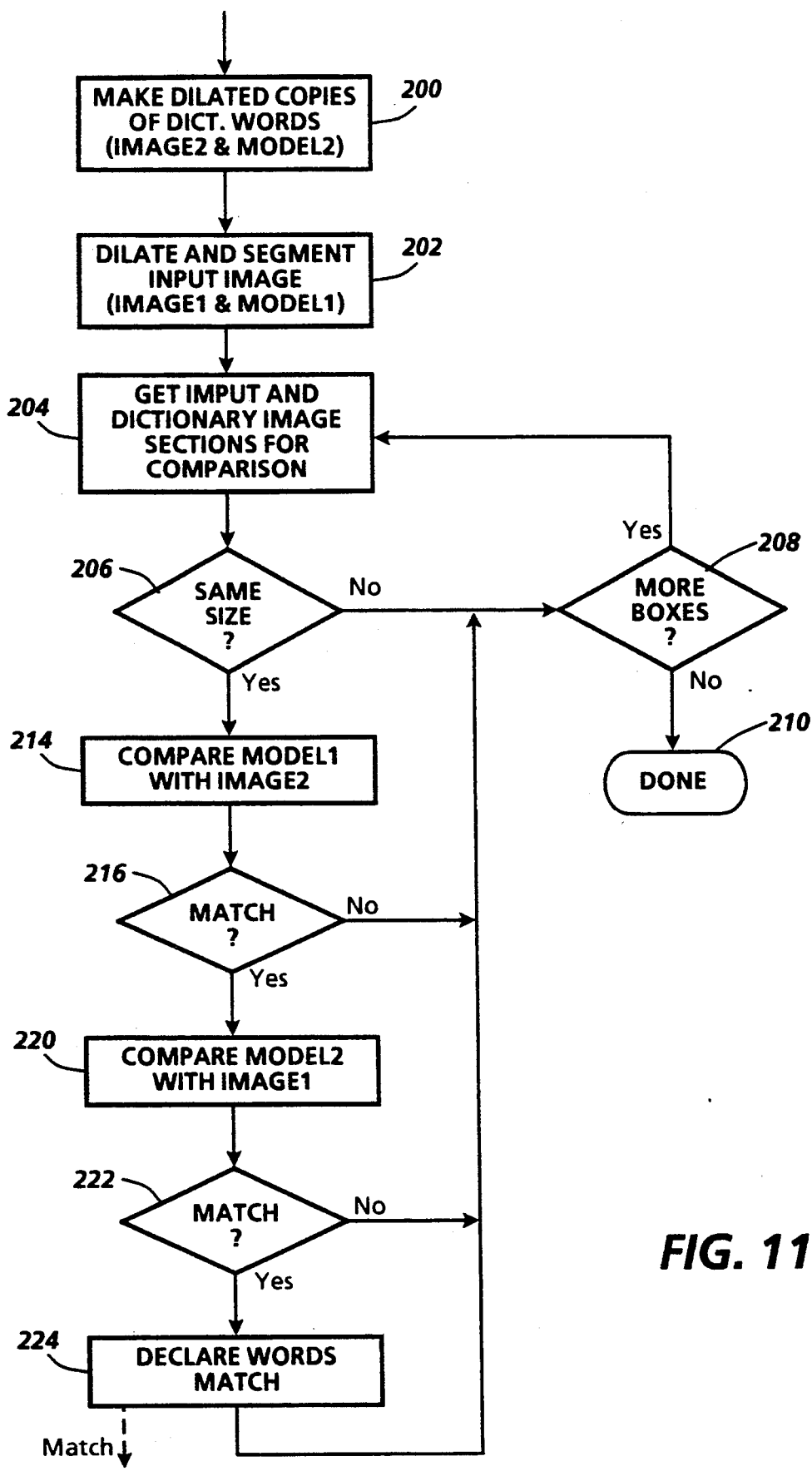
FIG. 11 is a flowchart illustrating the general process used to compare the images within the word boundaries determined by the instant invention.

The above comparison process is generally illustrated in FIG. 11. Initially, word comparator 24 copies the pixels within the boundaries of a word image (box2) specified in the "dictionary" of word images 26. These pixels are referred to hereinafter as model2. The word comparator then takes the copy of model2 and dilates it to produce the image2 (dilated image), step 200. That is, for every "on" or black pixel in model2, it turns on, or makes black, its surrounding neighbors. The exact number of neighbors is specified by a dilation radius that is predefined. As an example, a preferred dilation radius of 1.0 pixels turns on the four abutting neighbors while a radius of 1.4 pixels turns on all eight adjacent, neighboring pixels. Moreover, the higher the dilation radius, the greater potential for an erroneous match between words which are not the same.

Next, a copy of the entire input image 10 is dilated as described above and the pixels within the dilated boundaries of every box specified in the box list are copied out of the dilated input image, step 202. These sets of pixels, representing individual dilated "words," are hereinafter referred to as image1 (dilated portions of the input image) while the original, non-dilated word segments of the input image are hereinafter referred to as model1. As with the box2 images, the pixel representations of words within each image will appear "fatter" and more filled in than the corresponding model. Subsequently, the program compares the box sizes and proceeds to build classes of boxes or image sections that may be matched (i.e. boxes that are believed to be the same word in both the input image and the "dictionary" image). Although described with respect to the comparison of a portion of an input image with a known or "dictionary" word segment, the present invention also compares word segments within the same or other images and should not be viewed as limited to the example which has been described for purposes if describing the operation of the present invention.

Once the input and "dictionary" images have had their associated dilated images created, a pair of input (box1) and dictionary (box2) images are selected for comparison at step 204. Next, the comparator tests to determine whether the boxes are "reasonably" close in dimensions, step 206. That is, whether or not the two boxes are within a predefined range in their respective widths and heights. If not, a new pair of images (input and dictionary) is selected for comparison, step 204, once it has been determined that more boxes (image sections) are available, step 208. Otherwise, assuming the bounding boxes for the selected input and dictionary image pair are approximately the same size, each pair of word boxes is then further compared to see if they match using the following general operations:

1) model1 is superimposed over image2;

2) the number of black model1 points matching black image2 points is counted and then divided by the total number black of model1 points (step 214);

3) if the percentage of matching black pixels is above a predefined threshold percentage, the boxes are determined to "match" in the first instance (step 216); then 4) model2 is superimposed over image 1;

5) the two image sections are again compared as in step 2 above and a second percentage of matching black pixels determined (step 220);

6) if this second percentage is above the predefined threshold percentage, the boxes are determined to "match" in the second instance (step 222); and 7) whenever the image sections match in both instances, they are considered to be the same word, and an indication of the word match is generated by the word comparator 24 of FIG. 2 (step 224).

In recapitulation, the present invention is a method and apparatus for determining the boundaries of text or character strings represented in an array of image data by shape, without a requirement for individually detecting and/or identifying the character or characters making up the strings. The method relies upon the detection of connected components within words to first determine text line boundaries and to isolate the connected components into text rows. Subsequently, the relationships between components within the rows (i.e. overlap, intercharacter spacing, and inter-word spacing), are used to further combine adjacent sets of connected components into words or similar units of semantic understanding.

It is, therefore, apparent that there has been provided, in accordance with the present invention, a method and apparatus for identifying word bounding boxes in text. The invention has been described with reference to a preferred embodiment, namely a software implementation designed to be implemented in a computer system, employing one or more microprocessor or arithmetic processing devices for the execution of predefined instructions to achieve the operations hereinbefore described with respect to processing of the image data. In addition, the invention may also be achieved using specialized hardware which is designed to implement the operations described herein. Furthermore, the invention has been described as a portion of a larger word recognition system. However, as previously noted, the present invention has the potential for use in text and word editing, or related systems. Practically speaking, any system requiring the isolation of discrete word objects or removal of extraneous marks might utilize the present invention. Finally, the invention has been described with respect to textual images. However, this invention would also be applicable for images that include non-textual image portions as well. Obviously, modifications will occur to others upon reading and understanding the specification taken together with the drawings. This embodiment is but one example, and various alternatives, modifications, variations or improvements may be made by those skilled in the art from this teaching which is intended to be encompassed by the following claims.

I claim:

1. A method of extracting at least one string of characters forming a word object within rasterized data defining an image, comprising the steps of:

(a) finding the connected components within the image wherein the image comprises at least one text row including a plurality of word objects;

(b) identifying rectangular boundaries about each group of connected components within the image;

(c) locating text rows using the rectangular boundaries identified in step (b); and (d) combining adjacent groups of connected components within the text rows located in step (c), based upon a relationship between the rectangular boundaries of the adjacent groups, so as to segment the image into strings of characters forming word objects.

2. The method of claim 1, wherein said step of finding the connected components comprises the steps of:

(a) locating a first black pixel within the image;

(b) iteratively associating all black pixels which are neighbors of the first black pixel until all the black pixels connected to the first pixel are determined, to form a connected component; and (c) repeating steps (a) and (b) until all black pixels within the image have been associated with a connected component.

3. The method of claim 2, further including the step of dilating the image by a predetermined amount prior to locating the first black pixel within the image.

4. The method of claim 2, wherein said step of identifying rectangular boundaries comprises the steps of:

(a) locating associated pixels at horizontal and vertical extremes of each group of black pixels associated with a first black pixel; and (b) determining a rectangular boundary about each group, the rectangular boundary representing the horizontal and vertical extremes.

5. The method of claim 4, wherein the rasterized data defining the image is a bitmap rasterized with respect to a pair of orthogonal image axes, and said boundary determining step determines a rectangular box, the major axes of which are parallel to the image axes.

6. The method of claim 1, further including the steps of:

(a) identifying those groups of connected components which represent noise in the image; and (b) removing the groups of connected components identified in step (a).

7. The method of claim 6, wherein the image has a quantifiable height, and said group identifying step includes the step of identifying, as noise groups of connected components having a boundary with a height greater than twenty-percent of the height of the image.

8. The method of claim 6, wherein said group identifying step includes the step of identifying, as noise groups of connected components having a boundary with a height greater than a ninetieth percentile height determined from the heights for all boundaries within the image.

9. The method of claim 6, wherein said group identifying step includes the step of identifying, as noise groups of connected components having a boundary with a height less than one-third of the ninetieth percentile height.

10. The method of claim 1, wherein the step of locating text rows comprises the steps of:

(a) projecting the connected component boundaries onto a vertical or axis of the image;

(b) generating a histogram which reflects the frequency of boundaries projected as a position along the vertical axis;

(c) identifying the space separating text rows as points along the vertical axis of the image where minimums are present in the histogram generated in step (b).

11. The method of claim 10, wherein the step of locating text rows further comprises the step of smoothing the histogram prior to separating the text rows.

12. The method of claim 10, wherein the step of locating text rows further comprises the step of assigning any groups of connected components having a boundary lying across the space separating text rows to one of the text rows.

13. The method of claim 10, wherein the step of locating text rows further comprises the steps of:
   (a) projecting, onto a horizontal axis of the image, the boundaries of each group of connected components within a text row;
   (b) eliminating from said projection data which is representative of noise; and
   (c) dividing a row, where the horizontal axis projection indicates greater than a predetermined percentage of overlapping boundaries for the text row, into a plurality of separate text rows.

14. The method of claim 1, wherein the step of combining adjacent groups of connected components comprises the steps of:
   (a) generating a histogram of the separation distances between adjacent components with a text row;
   (b) determining, from the histogram, a threshold separation distance; and
   (c) merging adjacent groups of connected components having separation distances between their boundaries which are less than the threshold separation distance.

15. The method of claim 14, wherein the step of determining a threshold separation distance comprises the steps of:
   (a) locating two local maxima separated by a minima in the separation distance histogram; and
   (b) selecting a threshold separation distance lying between the two local maxima.

16. The method of claim 15, wherein the step of selecting a threshold separation distance comprises the step of setting the threshold separation distance to the average of the two maxima.

17. The method of claim 14, wherein the step of merging adjacent groups of connected components comprises the step of redimensioning the boundaries for the merged components so that the boundaries surround all components merged therein.

18. The method of claim 1, further including the step of sorting the word objects based upon the coordinate locations of the boundaries thereof so as to place the word objects in reading order.

19. A method of eliminating noise within rasterized data defining an image consisting primarily of textual information, comprising the steps of:
   (a) finding the connected components within the image wherein the image comprises at least one text row including a plurality of word objects;
   (b) identifying rectangular boundaries about each group of connected components within the image;
   (c) locating text rows using the rectangular boundaries identified in step (b);
   (d) combining adjacent groups of connected components within the text rows located in step (c), based upon a relationship between the rectangular boundaries of the adjacent groups, so as to define the rectangular boundaries of strings of characters forming word objects; and
   (e) characterizing all groups of connected components not falling within the rectangular boundaries of strings of characters forming word objects as noise so that they may be eliminated from the image.

20. The method of claim 19, wherein said step of finding the connected components comprises the steps of:
   (a) locating a first black pixel within the image;
   (b) iteratively associating all black pixels which are neighbors of the first black pixel until all the black pixels connected to the first pixel are determined to form a connected component; and
   (c) repeating steps (a) and (b) until all black pixels within the image have been associated with a connected component.

21. The method of claim 20, further including the step of dilating the image by a predetermined amount prior to locating the first black pixel within the image.

22. The method of claim 20, wherein said step of identifying rectangular boundaries comprises the steps of:
   (a) locating associated pixels at horizontal and vertical extremes of each group of black pixels associated with a first black pixel; and
   (b) determining a rectangular boundary about each group, the rectangular boundary representing the horizontal and vertical extremes.

23. The method of claim 22, wherein the rasterized data defining the image is a bitmap rasterized with respect to a pair of orthogonal image axes, and said boundary determining step determines a rectangular box, the major axes of which are parallel to the image axes.

24. The method of claim 19, further including the steps of:
   (a) identifying those groups of connected components which represent noise in the image; and
   (b) removing the groups of connected components identified in step (a).

25. The method of claim 24, wherein the image has a quantifiable height, and said group identifying step includes the step of identifying, as noise groups of connected components having a boundary with a height greater than twenty-percent of the height of the image.

26. The method of claim 24, wherein said group identifying step includes the step of identifying, as noise groups of connected components having a boundary with a height greater than a ninetieth percentile height determined from the heights for all boundaries within the image.

27. The method of claim 24, wherein said group identifying step includes the step of identifying, as noise groups of connected components having a boundary with a height less than one-third of the ninetieth percentile height.

28. The method of claim 19, wherein the step of locating text rows comprises the steps of:
   (a) projecting the connected component boundaries onto a vertical axis of the image;
   (b) generating a histogram which reflects the frequency of boundaries projected as a position along the vertical axis;
   (c) identifying the space separating text rows as points along the vertical axis of the image where minimums are present in the histogram generated in step (b).

29. The method of claim 28, wherein the step of locating text rows further comprises the step of smoothing the histogram prior to separating the text rows.

30. The method of claim 28, wherein the step of locating text rows further comprises the step of assigning any groups of connected components having a boundary lying across the space separating text rows to one of the text rows.

31. The method of claim 28, wherein the step of locating text rows further comprises the steps of:
   (a) projecting, onto a horizontal axis of the image, the boundaries of each group of connected components within a text row;
   (b) eliminating from said projection data which is representative of noise; and
   (c) dividing a row, where the horizontal axis projection indicates greater than a predetermined percentage of overlapping boundaries for the text row, into a plurality of separate text rows.

32. The method of claim 19, wherein the step of combining adjacent groups of connected components comprises the steps of:
   (a) generating a histogram of the separation distances between adjacent components with a text row;
   (b) determining, from the histogram, a threshold separation distance; and
   (c) merging adjacent groups of connected components having separation distances between their boundaries which are less than the threshold separation distance.

33. The method of claim 32, wherein the step of determining a threshold separation distance comprises the steps of:
   (a) locating two local maxima separated by a minima in the separation distance histogram; and
   (b) selecting a threshold separation distance lying between the two local maxima.

34. The method of claim 33, wherein the step of selecting a threshold separation distance comprises the step of setting the threshold separation distance to the average of the two maxima.

35. The method of claim 32, wherein the step of merging adjacent groups of connected components comprises the step of redimensioning the boundaries for the merged components so that the boundaries surround all components merged therein.

36. The method of claim 19, further including the step of sorting the word objects based upon the coordinate locations of the boundaries thereof so as to place the word objects in reading order.

* * * * *